INVENTOR
Stanford Landell
BY
C. H. Ribble
ATTORNEY

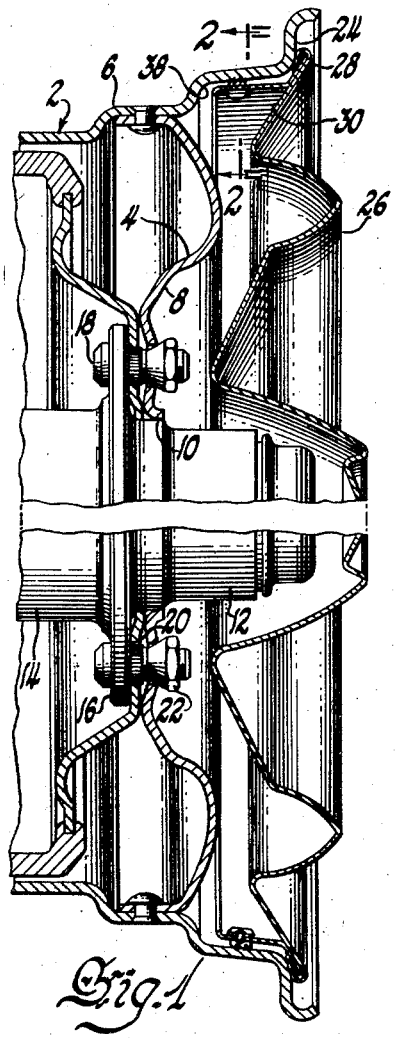
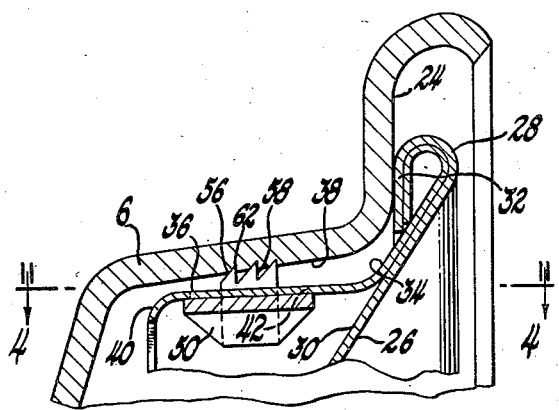
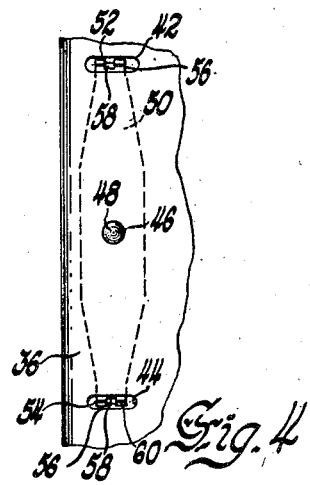
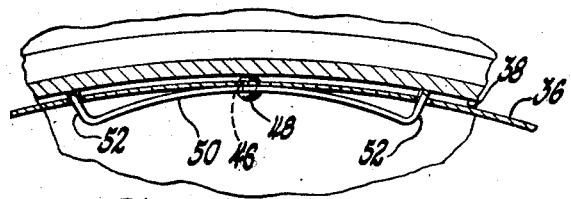
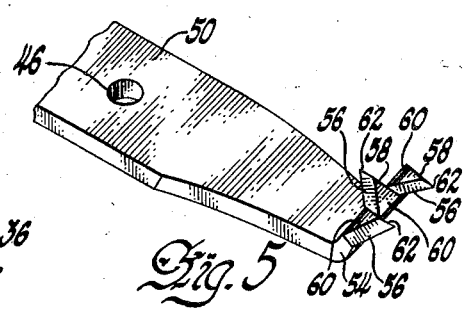
INVENTOR
Stanford Landell
BY
ATTORNEY Dec. 28, 1954  S. LANDELL  2,698,203
WHEEL COVER Filed Nov. 27, 1953  2 Sheets-Sheet 2

United States Patent Office 2,698,203
Patented Dec. 28, 1954

2,698,203

WHEEL COVER

Stanford Landell, Fayetteville, N. Y., assignor to General Motors Corporation, Detroit, Mich., a corporation of Delaware Application November 27, 1953, Serial No. 394,586

7 Claims. (Cl. 301—37)

This invention relates to vehicle wheel covers and more particularly to resilient retaining means for securing the cover to a vehicle wheel.

The prior art is replete with wheel covers wherein a plurality of circumferentially spaced relatively flat resilient cover retainer blades are secured to a flange of the cover. Each blade is usually provided with radially directed bent up end portions having terminal edges adapted for biting engagement with an intermediate flange of a vehicle wheel rim. Most commonly, the terminal edges are profiled to form either a single forwardly inclined pointed tooth or a plurality of aligned teeth directed in planes normal to the surface of the cover. While the latter type theoretically provides a greatly increased number of contact points with the wheel rim, in practice serious difficulty is encountered in securing uniform contact between the wheel rim and each of the plurality of aligned saw teeth, because of variation in tooth length incident to mass production. Therefore, generally, only a small proportion of the total number of the biting edges of the teeth effectively engage the wheel rim. In addition, since the saw teeth are aligned in a single plane, all the teeth of each edge grip the rim along a common and relatively narrow line. Consequently, even under ideal conditions the total surface contact between the teeth and the rim is relatively limited.

An object of the present invention is to provide a vehicle wheel cover having circumferentially spaced axially directed saw tooth rim engaging retaining means, wherein each individual tooth engages the rim at a point circumferentially spaced from an adjacent tooth.

Another object is to provide a wheel cover having retaining means of the type described which provide greatly increased contact area between the teeth and the rim of a wheel.

A further object is to provide a wheel cover having resilient saw tooth rim engaging means requiring greatly reduced deflection during application of the cover to the wheel.

A still further object is to provide a wheel cover of the stated character which is simple in construction, low in cost, and efficient in operation.

These and other objects and advantages of the invention will be readily apparent from the following description of certain preferred embodiments when taken in conjunction with the accompanying drawings wherein:

Fig. 1 is a front elevational view, partly in section, of a vehicle wheel and wheel cover assembly embodying the novel features of the invention.

Fig. 2 is an enlarged fragmentary sectional view of a portion of the wheel and cover assembly taken substantially along the lines 2—2 of Fig. 1.

Fig. 3 is an enlarged fragmentary front elevational view of a portion of the wheel and cover assembly more clearly illustrating the novel retaining means.

Fig. 4 is a fragmentary view of a portion of the cover retaining flange taken along the lines 4—4 of Fig. 3.

Fig. 5 is an enlarged fragmentary perspective view of a portion of the novel retaining means wherein the novel features are exaggerated for clarity.

Figure 6:
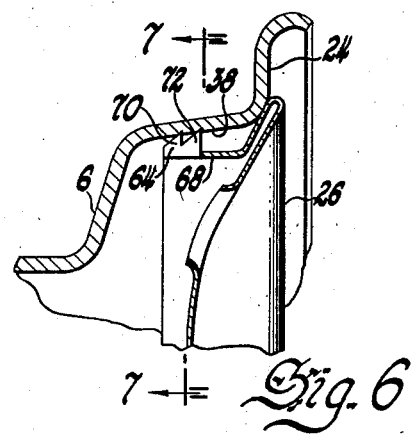
Fig. 6 is an enlarged sectional elevational view of a modified form of the invention.
Figure 8:
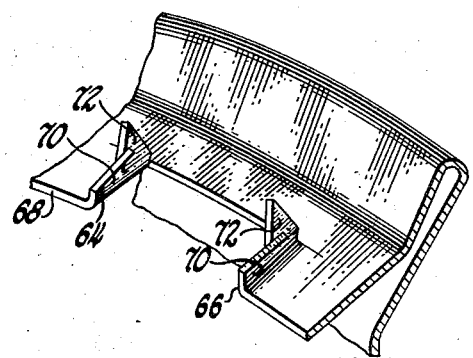
Fig. 8 is an enlarged fragmentary perspective view of a portion of the cover assembly wherein the arrangement of the teeth is exaggerated for the purposes of clarity.
Figure 7:
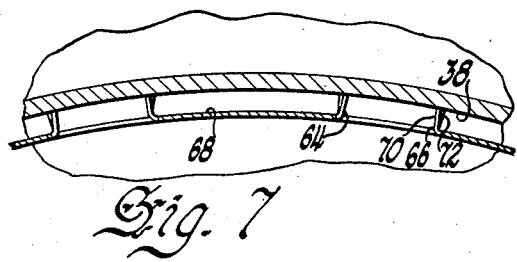
Fig. 7 is an enlarged fragmentary sectional view of a portion of the wheel and cover assembly taken substantially along the lines 7—7 of Fig. 6.

Referring now to the drawings and particularly Fig. 1, there is illustrated a vehicle wheel 2 of conventional construction comprising an outwardly bowed wheel body 4 having a multi-flanged drop center rim 6 riveted at the outer periphery thereof. Wheel body 4 is formed with a circular dished portion 8 having a central opening 10 formed therein which is adapted for sliding cooperation with the hub 12 of a vehicle axle 14. Radially arranged around a circular flange 16 formed integrally on hub 12 are a plurality of rigidly secured axially directed wheel bolts 18 which extend outwardly through similarly arranged apertures 20 formed in the dished portion 8 of the wheel body 4. After disposition of the wheel on the axle 14, wheel nuts 22 are threadably disposed on bolts 18 to draw the wheel into rigid engagement with the flange 16.

Disposed in substantially flush relation with an outer radial flange 24 of wheel 2 is a circular sheet metal wheel cover 26. In the illustrated embodiment, wheel cover 26 is of compound angularity in cross section. However, it will be understood that the cross sectional configuration of the cover forms no part of the invention and may take any desired form. As seen best in Fig. 3, cover 26 is provided with a turned peripheral margin 28 having a return fold extending radially inwardly in converging relation with the rear surface 30 of cover 26 to form a radially inwardly directed flange 32 adapted to retain the outer turned margin 34 of a separate annular cover retaining flange 36. Flange 36 is preferably of a diameter slightly less than the inside diameter of the intermediate flange 38 of vehicle wheel rim 6 and is provided with an inturned margin 40 to impart stiffness thereto.

To retain cover 26 in adjusted position over the outer surface of the wheel, in accordance with the present invention, axially directed annular flange 36 is pierced at spaced intervals to provide a series of pairs of relatively narrow axially elongated slots 42 and 44. Intermediately of each pair of slots 42 and 44, flange 36 is provided with a circular aperture 46. Disposed around the inner periphery of flange 36 adjacent apertures 46 are a plurality of individual curved elongated retaining members 50 which are rigidly secured to flange 36 by rivets 48 extending through aperture 46. As seen best in Fig. 4, retainer members 50 are formed of relatively heavy gauge metal, preferably spring steel, and are provided with struck up ends or fingers 52 and 54 which extend radially outwardly, respectively, through slots 42 and 44 of flange 36 for biting, gripping engagement with the intermediate flange 38 of wheel rim 6. Each of struck up fingers 52 and 54 provides a relatively narrow axially extended portion which is notched to form a saw tooth terminal edge. To assure free axial inward movement of the cover 26 and resist axial outward movement thereof, the saw tooth terminal edges preferably comprise alternating inclined leading edges 56 and vertically directed trailing edges 58 providing a plurality of aligned teeth 60 having biting edge 62. To provide broadened contact area and assure uniform contact between rim 6 and each individual tooth, the outer ends of teeth 60 are angled outwardly alternately, bent outwardly from a common root, as seen best in Figs. 2 and 5. By bending the teeth 60, as described, the effective width of the biting edges 62 may be doubled with no increase in the normal thickness of the retainer member 50. In addition, positive contact between the rim and each tooth is more readily attained. Because of the angle of inclination assumed by each of the bent teeth relative to the periphery of wheel rim 6, upon initially forming saw teeth 60, the biting edges 62 thereof are preferably beveled to assure ultimate parallelism between edges 62 and the periphery of rim flange 38. It will, therefore, be apparent that the width of each gripping edge 62 is substantially greater than the normal thickness of the retainer member 50. Consequently, the aggregate width of the staggered teeth is many times that previously attained with retainer members having saw teeth lying in a common plane.

In Fig. 6, there is shown a modification of the invention as applied to a wheel cover construction of the type illustrated in my copending application Serial No. 376,890 entitled Wheel Cover, filed August 27, 1953. In this embodiment, integral finger portions 64 and 66 are struck up from the cover retaining flange 68. Each finger 64 and 66 is notched to provide a series of axially aligned saw teeth 70 and 72 which are formed and alternately staggered in the manner previously described. In this embodiment, substantially all the advantages of the present invention are retained while eliminating the need for separately forming and attaching the retaining means.

From the foregoing, it will be seen that a novel and highly improved cover retaining means has been devised which provides greatly increased efficiency. In addition, by virtue of the multiple tooth construction and of the relatively shallow depth thereof, only a minimum inward deflection of the resilient member is necessitated to accomplish installation of the cover on the wheel. Conversely, because of the greatly increased surface engagement provided by the staggered tooth construction, the possibility of the cover being dislodged is virtually eliminated.

While but two embodiments of the invention have been shown and described, it will be apparent to those skilled in the art that other changes and modifications may be made therein. It is, therefore, to be understood that it is not intended to limit the invention to the embodiments shown but only by the scope of the claims which follow.

I claim:

1. A vehicle wheel cover comprising a circular sheet metal outer portion, a continuous annular flange portion, and cover retaining means extending radially outwardly from said flange, said last mentioned means having axially directed saw tooth terminal edges, said teeth of said terminal edges being oppositely bent alternately from a common plane.

2. A vehicle wheel cover comprising a circular sheet metal outer portion, a continuous annular flange portion, and resilient cover retaining means secured to and extending radially outwardly from said flange, said last mentioned means having axially directed saw tooth terminal edges, said teeth of said terminal edges being oppositely inclined alternately from a common plane.

3. A vehicle wheel cover comprising a circular sheet metal outer portion, a continuous annular flange portion, and circumferentially spaced cover retaining members secured to said flange, said members having radially outwardly extending end portions, said end portions being formed with axially directed saw tooth terminal edges, said teeth being oppositely bent alternately from a common plane.

4. A vehicle wheel cover comprising a circular sheet metal outer portion, a continuous annular flange portion, and circumferentially spaced cover retaining members secured to said flange, said members having a curved body portion and radially outwardly extending finger portions at each end thereof, said finger portions being formed with axially directed saw tooth terminal edges, the outer ends of said teeth being angled oppositely from a common plane.

5. A vehicle wheel cover comprising a circular sheet metal outer portion, a rearwardly directed continuous annular flange formed on said outer portion, and cover retaining means extending radially outwardly from said flange, said last mentioned means being formed with a series of axially aligned forwardly directed teeth, the terminal edges of said teeth being alternately beveled oppositely, said teeth being laterally inclined alternately from a common plane whereby said beveled edges lie along a common circumference.

6. In a cover structure for a vehicle wheel including a multi-flanged tire rim, said cover structure having a continuous annular flange concentric therewith and adapted for nesting relation with said rim, a plurality of circumferentially spaced radially extending fingers secured on said flange, said fingers having saw tooth terminal edge portions disposed in planes normal to the surface of said wheel, said teeth being oppositely inclined alternately from a common plane and having beveled biting edges substantially paralleling the periphery of said tire rim to provide maximum gripping engagement therewith.

7. In a cover structure for a vehicle wheel including a multi-flanged tire rim, cover retaining means comprising a continuous annular flange disposed in concentric relation with said cover and adapted for nesting relation with said rim, means forming circumferentially spaced pairs of slots in said flange, a plurality of resilient fingers secured on said flange and having turned up end portions extending through said slots, and means forming a plurality of axially directed saw teeth at the terminal edges of said turned up end portions, said teeth of each of said end portions being laterally inclined alternately from a common plane to provide circumferentially spaced gripping engagement with said rim.

References Cited in the file of this patent

UNITED STATES PATENTS

| Number | Name | Date |
|---|---|---|
| 1,540,508 | White | June 2, 1925 |
| 1,800,173 | Anderson | Apr. 7, 1931 |
| 1,889,070 | Hyatt | Nov. 29, 1932 |
| 1,953,634 | Reichenbach | Apr. 3, 1934 |